Patented June 26, 1951

2,558,245

UNITED STATES PATENT OFFICE 2,558,245

LIQUID SULFUR COLORS COMPRISING HYDROXY-ALIPHATIC COMPOUNDS

Robert Howard Grant, Penns Grove, N. J., assignor to E. I. du Pont de Nemours & Company, Wilmington, Del., a corporation of Delaware No Drawing. Application December 9, 1947, Serial No. 790,692

2 Claims. (Cl. 8—37)

This invention relates to the manufacture of liquid sulfur dye compositions, and more particularly to such compositions containing concentrations of sulfur dyestuffs which are much greater than the concentrations employed in dyebaths.

Sulfur dyestuffs are usually applied from solution or suspension in aqueous sodium sulfide in which they are reduced and solubilized in order to accomplish the dyeing operation. Other materials such as alkalies, buffers, and wetting agents are generally incorporated in the dyebath to increase the solubility and improve the dyeing properties of the dye. Acid salts are sometimes used to create a reducing atmosphere of hydrogen sulfide in the vicinity of the fiber or fabric to prevent oxidation at the selvedges.

Liquid sulfur dyes are superior to the paste or powder forms used in the past because all of the ingredients required in the dyebath may be included in the liquid dye formula by the manufacturer. This greatly simplifies the use of the dye since it need only be diluted to the proper strength with water to prepare the dyebath. Since the manufacturer can accurately standardize the formula, more dependable results are obtained than when the dyer introduces the ingredients separately into the dyebath. Objectionable impurities, especially insoluble matter, may be eliminated from liquid dyes, whereas sediment and other impurities are commonly introduced into the dyebath when the ingredients are added separately by the dyer. Liquid dyes are cleaner to use than other forms of dyes especially in removing the problem of dusting, because the liquid dyes may be piped to the tank in which the dyebath is prepared.

Liquid sulfur dyes have the disadvantage of being more bulky than other forms of dyes. This is a serious difficulty in the shipment, storage and handling of liquid dyes. The concentration should not exceed that at which the liquid will remain sufficiently fluid to handle and will have sufficient stability to retain all of the ingredients in solution at the lowest temperatures to be encountered. The ingredients are not equally soluble and when a partial separation of material occurs in cold weather the composition of the solution is changed. It is possible for the separated material to be brought back into solution by warming and agitating the liquid, but this is neither convenient nor practical for the dyehouse to attempt, and usually the dyer will not know that separation has occurred until too late.

It is among the objects of the present invention to make possible more highly concentrated liquid sulfur dyes which have satisfactory stability, handling, storage and application properties, as well as being practically free from sediment. Other objects of the invention will become apparent from the following description and the appended claims.

The objects of the invention are attained in general by providing liquid sulfur dye compositions characterized by being solutions of sulfur dyestuffs in balanced proportions of water, a water-miscible hydroxyaliphatic compound of 1 to 4 carbon atoms, and sodium and bivalent sulfur compounds such as sodium sulfide and sodium hydroxide. Sodium polysulfides may also be used but are less desirable because of their tendency to deposit sulfur dust on materials being dyed.

The sulfur dyestuff is introduced into solution in the form of a solubilized sulfur melt, sulfurization mass, filter cake, concentrated slurry, dry crude dye, standardized dye (crude admixed with diluent and/or assistants), or as powders or grains with or without diluents or assistants. The term "solubilized sulfur melt" refers to the product obtained by adding caustic soda to a thionation mass and heating to convert excess sulfur from the thionation into sodium sulfide and sodium thiosulfate. The sulfur dyestuff, in whatever form used, is analyzed for uncombined sulfur, sodium sulfide and sodium sulfhydrate or sodium hydroxide by any of the well known methods of analysis and the amounts of additional sodium and bivalent sulfur compounds determined for the type of solution desired.

In compounding the solutions from dyestuffs which do not already contain sodium sulfide, allowance must be made for the small but varying amount of sodium sulfide consumed in vatting operations which does not contribute to the reduction of the dyestuff. (U. S. P. 1,630,818.) Such amounts of sodium sulfide do not appear as sodium sulfide when the solutions are analyzed. There is generally more or less free sulfur in the dyestuffs. When thionation masses are utilized instead of dry dyestuff and sodium hyroxide is use for solubilizing, the sulfur affects the composition of the final solution. These factors are determined beforehand and allowed for in making the solutions in accordance with the present invention. In the specification and claims, the proportions and amounts of sodium and bivalent sulfur compounds specified as constituents of the products are those which are present in the solutions after such allowances have been made.

The types and proportions of sodium and bivalent sulfur compounds used in the solutions are selected so that the ratio of sodium to bivalent sulfur is in the range of about 1.4 to about 2.2 parts of sodium to each part of bivalent sulfur. Preferably this ratio is achieved by the use of sodium sulfide alone (corresponding to 1.44 parts of sodium to one part of sulfur), or by the use of about two to six parts of $Na_2S$ to one part of NaOH (corresponding to 2.14 to 1.67 parts of sodium to one part of sulfur).

Representative of water-miscible hydroxyaliphatic compounds of one to four carbon atoms which may be used are methanol, ethanol, propanol, glycerine, ethylene glycol and ethylene glycol monoethyl ether. The use of these compounds in liquid dye compositions in accordance with this invention makes possible the production of liquid dyes of much higher concentration than would be expected from previous experience with liquid dyes which do not contain such compounds. The use of relatively small amounts of such compounds improves the solubility of the ingredients in the compositions and lowers the thickening point of the compositions, allowing more highly concentrated compositions to be shipped, stored and handled, especially during cold weather.

The amounts of the various ingredients in the dye composition must be chosen so that a balanced composition is obtained. Compositions have been found satisfactory which comprises for each 100 parts of composition about 10 to about 60 parts of sulfur dyestuff dissolved in about 30 to 70 parts of water, about 3 to about 15 parts of water-miscible hydroxyaliphatic compound of one to four carbon atoms, and about 7 to about 15 total parts of combined sodium and combined bivalent sulfur, such as $Na_2S$ or $Na_2S$ and NaOH, in the ratios previously indicated.

The invention is illustrated in greater detail by the following examples:

Example 1

A reaction kettle is charged with approximately 23 pounds of sodium sulfide crystals (containing 30% to 32% $Na_2S$), approximately 12 pounds of ethylene glycol monoethyl ether, approximately 46 pounds of water and approximately 20 pounds of a crude dried Sulfur Navy Blue (Color Index No. 959). The temperature is raised with agitation to 50°–70° C. and held at that temperature until the dye is in solution. The resulting solution contains about 20 pounds of dyestuff, about seven pounds $Na_2S$, about 62 pounds of water and about 12 pounds of ethylene glycol monoethyl ether. The concentration may be adjusted at this point by the addition of water. The solution is then settled and decanted or filtered or centrifuged to clarify the liquid dye.

Example 2

A kettle is charged with approximately 60 pounds of a tan sulfur color slurry of a caustic solubilized sulfur melt equivalent to about 20 pounds of standard strength commercial sulfur tan (C. I. 948) and containing about five pounds of sodium sulfide. To this are added approximately eight pounds of sodium sulfide crystals (30–32%), eight pounds of sodium hydroxide solution (30–32%), about nine pounds of water and about 15 pounds of ethylene glycol monoethyl ether. The charge is agitated and the temperature raised to and held at 50°–70° C. until the dye is in solution. The resulting solution contains about 20 pounds of dyestuff, about 7.5 pounds of $Na_2S$, about 2.5 pounds of NaOH, about 55 pounds of water and about 15 pounds of ethylene glycol monoethyl ether. The concentration may be adjusted at this point by the addition of water. The solution is then settled and decanted or filtered or centrifuged to clarify the liquid dye.

Example 3

A kettle is charged with approximately 65 pounds of a sulfur black (C. I. 978) press cake equivalent to about 50 pounds of a standardized commercial sulfur black, approximately 25 pounds of sodium sulfide flakes (60%) and approximately six pounds of water. The charge is agitated and the temperature raised to and held at 70°–100° C. until the dye is in solution. The charge is then cooled below 50° C. and approximately four pounds of methyl alcohol are added. The resulting solution contains about 50 pounds of dyestuff, about 15 pounds of $Na_2S$, about 31 pounds of water and approximately four pounds of methyl alcohol. The concentration may be adjusted at this point by the addition of water. The solution is then settled and decanted or filtered or centrifuged to clarify the liquid dye.

Example 4

A kettle is charged with approximately 60 pounds of a tan sulfur color slurry of a solubilized sulfur melt equivalent to about 20 pounds of standard strength commercial sulfur tan (C. I. 948) and containing about five pounds of sodium sulfide. To this is added approximately eight pounds of sodium sulfide crystals (30–32%), eight pounds of sodium hydroxide solution (30–32%) and about 21 pounds of water. The charge is agitated and the temperature is raised to and held at 50°–70° C. until the dye is in solution. The charge is then cooled below 50° C. and approximately three pounds of methyl alcohol are added. The resulting solution contains about 20 pounds of dyestuff, about 7.5 pounds of $Na_2S$, about 2.5 pounds of NaOH, about 67 pounds of water and about three pounds of methyl alcohol. The concentration may be adjusted at this point by the addition of water. The solution is then settled and decanted or filtered or centrifuged to clarify the liquid dye.

Instead of the dyestuffs used in the above examples, sulfur greens, browns, yellows, bordeaux, etc., may be used at various concentrations depending on the color and shade desired. Assistants may be added to alter the viscosity, crystallizing or freezing point, application properties for specialties, stability, odor, etc.

The liquid dyes of this invention can be applied in the usual manner of applying sulfur dyestuffs with the advantages that nothing other than water need be added before the dyeing operation begins and it is unnecessary to boil the dye or dyebath to dissolve or vat the dyestuff. They are characterized by their low viscosity, ranging between that of water and a light lubricating oil at ordinary temperatures, and their completeness of formulation. Storage space required for sodium sulfide, soda ash and other accessories to ordinary dyeing technique is freed for other purposes and the number of materials to be handled and inventoried in the mill is reduced. They are also clean to handle. They have satisfactory stability, handling, storage and application properties under the conditions normally encountered and are free from sediment. As compared with liquid dyes previously known, they are more concentrated and therefore less bulky to handle and store.

As many apparently widely different embodiments of this invention may be made without departing from the spirit and scope thereof, it is to be understood that the invention is not limited to the specific illustrations thereof except as defined in the appended claims.

I claim:

1. A liquid sulfur dye composition which at equilibrium essentially consists of, for each 100 parts of composition, about 20 to 60 parts of sulfur black dyestuff, 7 to 15 parts of $Na_2S$, the amount of $Na_2S$ being not in excess of one-half the amount of the sulfur dyestuff, about 30 to 70 parts of water, and 3 to 15 parts of water-miscible hydroxy aliphatic compound of one to four carbon atoms.

2. A liquid sulfur dye composition which at equilibrium essentially consists of, for each 100 parts of composition, about 20 to 60 parts of sulfur black dyestuff, 7 to 15 parts of $Na_2S$, the amount of $Na_2S$ being not in excess of one-half the amount of the sulfur dyestuff, about 30 to 70 parts of water, and 3 to 15 parts of methyl alcohol.

ROBERT HOWARD GRANT.

REFERENCES CITED

The following references are of record in the file of this patent:

UNITED STATES PATENTS

| Number | Name | Date |
| --- | --- | --- |
| 901,746 | Schmidt | Oct. 20, 1908 |
| 1,920,166 | Berthold | Aug. 1, 1933 |
| 1,987,583 | Berthold | Jan. 8, 1935 |
| 2,047,650 | Sala | July 14, 1936 |
| 2,130,415 | Buchanan | Sept. 20, 1938 |

FOREIGN PATENTS

| Number | Country | Date |
| --- | --- | --- |
| 16,149 | Great Britain | 1907 |
| 429,350 | Great Britain | May 27, 1935 |
| 159,928 | Switzerland | Apr. 17, 1933 |